D. Y. Smith,
Attaching Augers to Handles.
Nº 50,045.  Patented Sep. 19, 1865.
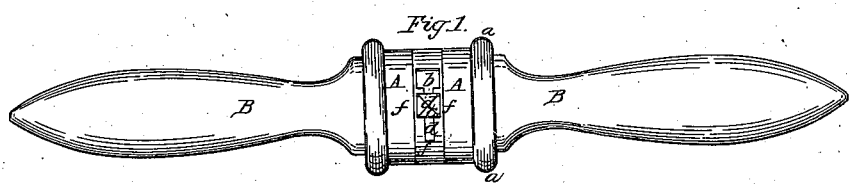
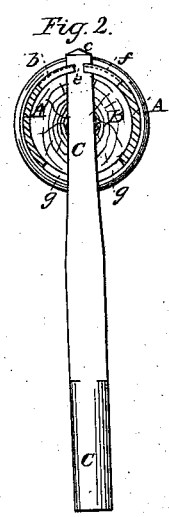
Witnesses.
Inventor:
D. Y. Smith
By atty A. B. Stoughton

UNITED STATES PATENT OFFICE.

DANIEL Y. SMITH, OF JOLIET, ILLINOIS.

IMPROVEMENT IN AUGER-HANDLES.

Specification forming part of Letters Patent No. 50,045, dated September 19, 1865.

*To all whom it may concern:*

Be it known that I, D. Y. SMITH, of Joliet, in the county of Will and State of Illinois, have invented certain new and useful Improvements in Auger-Handle Fastenings; and I do hereby declare the following to be a full, clear, and exact description of the same, reference being had to the accompanying drawings, making a part of this specification, in which—

Figur 1 represents a top plan of the handle and auger-shank fastening therein, and Fig. 2 represents a vertical cross-section through the same.

Similar letters of reference, where they occur in the separate figures, denote like parts in both.

I am aware that a cylinder or band to turn on the auger-handle and furnished with openings or slots to allow the head of the auger-shank to pass through and then to take under the shoulders or neck of the shank have been used; but this fastening simply has no provision for taking up the wear of the shank or its socket, and soon becomes loose and shackling and comparatively useless, as the handle gives no steadiness to the auger, and the user has no control over the auger, so as to bore straight holes or do neat work.

My invention consists in making a cam-swell on the band that margins the slot in the band which takes the neck of the auger-shank, so that as the shank or socket wears it only becomes necessary to turn the band a little farther, and thus the auger is always tight in the handle, and can be removed or replaced by another with the same facility that others not having this self-acting tightening upon it are capable of.

To enable others skilled in the art to make and use my invention, I will proceed to describe the same with reference to the drawings.

A is a metal band slipped onto the auger-handle B, and so arranged upon the handle as that it may be turned thereon, and for the facility of turning it has a milled flange, $a$, upon it. This band A, on the upper side of the handle B, has a square opening, $b$, cut through it, of the proper dimensions to admit the head $c$ of the auger-shank C to snugly pass through it, and from this opening $b$ a slot, $d$, extends circumferentially that will just take the neck $e$ of the auger-shank. A cam-swell, $f$, margins this slot $d$, so that by continuing to turn the band these cam ledges or swells $f$, taking under the shoulders of the auger-shank head, draw up the shank and tightly hold it to the handle. Diametrically opposite the opening $b$ and slot $d$ in the band A there is another slot, $g$, to allow the band to turn after the auger-shank is passed up through the handle. The mortise through the wood of the handle may be just of the size necessary to receive the shank.

The operation is obvious. By inserting the shank and turning the band the auger is tightly secured to the handle. By turning the band in the opposite direction it is loosened and may be removed. The cam-swell that margins the slot $d$ takes up all wear between the shank and its socket, and thus makes the tool always available and controllable.

Small steel wires may be placed under the band, both to prevent it from wearing away the wood and to keep it on the handle when the shank is out.

Having thus fully described my invention, what I claim is—

In combination with the auger shank and head and the handle and slotted turning band, the cam swell or ledge margining the slot $d$, so as to compensate for and take up all the wear between the shank and its socket and hold the auger always tightly to its handle, substantially as described.

DANIEL Y. SMITH.

Witnesses:
BENJAMIN RICHARDSON,
W. W. STEVENS.